United States Patent [19]

Watanabe et al.

[11] Patent Number: 5,773,501
[45] Date of Patent: Jun. 30, 1998

[54] FLAME RETARDANT STYRENE RESIN COMPOSITION

[75] Inventors: Kenji Watanabe; Michio Yasuda, both of Osaka, Japan

[73] Assignee: Daicel Chemical Industries, Ltd., Tokyo, Japan

[21] Appl. No.: 762,850

[22] Filed: Dec. 6, 1996

Related U.S. Application Data

[63] Continuation of Ser. No. 368,388, Dec. 30, 1994, abandoned, which is a continuation of Ser. No. 731,425, Jul. 17, 1991, abandoned.

[30] Foreign Application Priority Data

Aug. 17, 1990 [JP] Japan .................................. 2-216765

[51] Int. Cl.⁶ ............................. C08K 3/22; C08L 9/06
[52] U.S. Cl. ..................... 524/411; 524/341; 524/380; 524/412; 524/525; 524/577
[58] Field of Search ..................... 524/411, 412, 524/577, 525, 341, 380

[56] References Cited

U.S. PATENT DOCUMENTS

| | | | |
|---|---|---|---|
| 3,898,194 | 8/1975 | Sanroma | 260/45.75 B |
| 4,132,748 | 1/1979 | Arthur et al. | 260/873 |
| 4,343,854 | 8/1982 | Moorman | 524/466 |
| 4,353,820 | 10/1982 | Lindvay | 524/409 |
| 4,735,983 | 4/1988 | Takaku et al. | 524/281 |
| 4,966,935 | 10/1990 | Takahashi | 524/412 |
| 4,994,515 | 2/1991 | Washiyama et al. | 524/504 |

FOREIGN PATENT DOCUMENTS

| | | | |
|---|---|---|---|
| 143622 | 9/1980 | Germany . | |
| 151075 | 9/1981 | Germany . | |
| 2148545 | 7/1987 | Japan | 524/411 |
| 63-248724 | 10/1988 | Japan . | |

OTHER PUBLICATIONS

Benson, The Foundations of Chemical Kinetics, New York, McGraw–Hill Book Company, Inc., pp. 618–619 (1960).
Kirk–Othmer, Encyclopedia of Chemical Technology, Third Edition, 5, PP. 19–20 (1979).
**World Patents Index Latest, Derwent Publications Ltd., AN 88–334840, Oct. 1988, Abstract.

*Primary Examiner*—Andrew E.C. Merriam
*Attorney, Agent, or Firm*—Flynn, Thiel, Boutell & Tanis, P.C.

[57] ABSTRACT

A flame-retardant styrene resin composition comprises a styrene resin, a halogen-containing flame retardant and a flame retarding assistant comprising antimony trioxide having an average size of 5.2 microns or larger and is improved in view of weatherability.

9 Claims, No Drawings

FLAME RETARDANT STYRENE RESIN COMPOSITION

This application is a continuation of U.S. application Ser. No. 08/368,388 filed Dec. 30, 1994, now abandoned, which in turn is a continuation of application Ser. No. 07/731,425, filed Jul. 17, 1991, now abandoned.

The present invention relates to a flame-retardant styrene resin composition having an improved light resistance.

PRIOR ART

Styrene resins having excellent mechanical and electric properties and moldability are used for various purposes. However, since the styrene resins are flammable, it is eagerly demanded to make them nonflammable and to improve their light resistance when they are used for producing electric components or automobile parts.

Therefore, a flame retardant and a flame retarding assistant are usually added in the production of flame-retardant styrene resins. A halogenous flame retardant and antimony trioxide are most usually used as the flame retardant and the flame retarding assistant, respectively. In using the flame retardant and flame retarding assistant, it was desired to improve the compatibility and dispersibility of the additives in the resin by reducing the particle size of the additives as much as possible in order to prevent the properties such as mechanical strengths, e.g. tensile strength or impact resistance, of the molding from being impaired. Therefore antimony trioxide in the form of fine particles having an average particle diameter of less than 2 $\mu$m, for example, 0.5 $\mu$m has been used as the flame retarding assistant.

It is known that when a halogenous flame retardant is added to a flame retardant, various deterioration phenomena such as the formation of a carbonyl group or conjugated double bond, cross-linkage and breakage of the molecular chain are caused by the dehydrohalogenation of the flame retardant due to heat or light to cause coloring or to deteriorate the mechanical strengths. A light stabilizer, ultraviolet absorber, antioxidant, etc. are therefore used.

SUMMARY OF THE INVENTION

However, it was found that the coloring of a known flame-retardant styrene resin containing antimony trioxide as the flame retarding assistant was accelerated by antimony trioxide when the resin was exposed to light.

After intensive investigations made for the purpose of improving the light resistance of the flame-retardant styrene resin composition containing antimony trioxide as the flame retarding assistant, the inventors have found that the light resistance can be remarkably improved without impairing the flame retardancy or mechanical strengths of the molding by using antimony trioxide having an average particle diameter of at least 3 $\mu$m in place of ordinarily used antimony trioxide having an average particle diameter of as small as 2 $\mu$m or less. The present invention has been completed on the basis of this finding.

A flame-retardant styrene resin composition comprises a styrene resin, a halogen-containing flame retardant and a flame retarding assistant comprising antimony trioxide having an average size of 3 microns or larger and is improved in view of weatherability.

It is preferable that the composition comprises 100 parts by weight of a styrene resin, 3 to 50 parts by weight of a halogen-containing flame retardant and 0.5 to 15 parts by weight of antimony trioxide having an average size of 3 microns or larger.

The styrene resin is polystyrene, a homopolymer of a styrene compound or a copolymer of styrene or a styrene compound and a co-monomer.

Thus the present invention provides a flame-retardant styrene resin composition comprising a styrene resin containing a halogenous flame retardant and a flame retarding assistant, characterized in that antimony trioxide having an average particle diameter of at least 3 $\mu$m is used as the flame retarding assistant.

The term "styrene resin" as used in the present invention includes homopolymers and copolymers of styrene or its derivatives such as $\alpha$-methylstyrene and vinyltoluene; copolymers of these monomers with a vinyl monomer such as acrylonitrile, methyl methacrylate or N-phenylmaleinimide; copolymers of them with a diene rubber such as polybutadiene, ethylene or propylene; and copolymers produced by copolymerizing an ethylene/propylene rubber with styrene, its derivative or, if necessary, another vinyl monomer in the presence of a cross-linked acrylic rubber or the like. Examples of them include polystyrene, high-impact polystyrene, AS resin, ABS resin, MBS resin, AES resin and AAS resin. These resins may be used either singly or in the form of a mixture of two or more of them.

The halogenous flame retardant used in the present invention may be any of those usually used as the flame retardant for styrene resins. Examples of them include tetrabromobisphenol A, brominated bisphenol A carbonate oligomers, brominated bisphenol A epoxy resin, decabromodiphenylether, bis(tribromophenoxy)ethane, perchloropentanecyclodecane, and tris(tribromoneopentyl) phosphate.

These flame retardants can be used either singly or in the form of a mixture of two or more of them in the present invention.

The amount of the flame retardant is preferably as small as possible, since the mechanical properties of the composition are impaired as the amount of the additives is increased. The flame retardant is used in an amount of 3 to 50 parts by weight, preferably 6 to 35 parts by weight, for 100 parts by weight of the styrene resin. When its amount is less than 3 parts by weight, no sufficient flame retardancy can be obtained and, on the contrary, when it exceeds 50 parts by weight, the tensile strength and impact strength of the molding are reduced unfavorably. The average particle diameter of antimony trioxide used in the present invention is at least 3 $\mu$m, preferably 3 to 9 $\mu$m and still preferably 4 to 7 $\mu$m. When it is less than 3 $\mu$m, the light resistance is seriously reduced and, on the contrary, when it exceeds 9 $\mu$m, the tensile strength and impact strength of the molding are reduced unfavorably, though an excellent light resistance is obtained.

The average particle diameter is determined herein by determining the particle size distribution with a centrifugal precipitation particle size distribution determination apparatus (SA-CP 3; mfd. by Shimadzu Corp.) by the liquid phase precipitation optical transmission method and calculating the particle size of cumulative 50% by weight on the basis of the distribution.

Antimony trioxide used as the flame retarding assistant is produced by any well-known process such as a process wherein a sodium carbonate solution of senarmontite or valentinite occurring in nature or antimony oxychloride formed by hydrolyzing antimony chloride is boiled or a process wherein metallic antimony is oxidized with air.

A plasticizer, heat stabilizer, light stabilizer, ultraviolet absorber, pigment, dye or reinforcement such as glass fibers, glass beads or asbestos can be incorporated into the styrene resin of the present invention, if necessary.

The flame-retardant styrene composition of the present invention can be produced by any of ordinary processes. For example, it can be produced by mixing all of the above-described components of the composition at once, melt-kneading the mixture with an extruder to form pellets and molding the pellets.

A flame-retardant styrene resin having an excellent light resistance can be produced by incorporating antimony trioxide having an average particle diameter of at least 3 μm as the flame retarding assistant into a styrene resin containing a halogenous flame retardant according to the present invention.

EXAMPLES

The following Examples will further illustrate the present invention, which by no means limit the invention.

In the Examples, the performance tests were conducted by the following methods:

Light resistance (1) Irradiation with light:
apparatus: xenon long-life fadeometer
irradiation energy: 4.0 mW/cm$^2$(at 300 nm~400 nm)
temperature in the tank: 63° C.
humidity in the tank: 50% RH
(2) Color difference:
Color difference (ΔE) was calculated by the following equation:

$$\Delta E = ((L_2-L_1)^2+(a_2-a_1)^2+(b_2-b_1)^2)^{1/2}$$

wherein:
$L_1$, $a_1$ and $b_1$ represent the reference lightness ($L_1$) and chromaticity ($a_1$ and $b_1$ ),
and $L_2$, $a_2$ and $b_2$ represent the lightness ($L_2$) and chromaticity ($a_2$ and $b_2$) after discoloration.
The smaller the color difference, the lower the extent of discoloration.

Izod impact strength

Izod impact strength was determined according to ASTM D 256.

Flame resistance

Underwriters' Laboratories (U.S.A.) standard:
The order of flame retardancy in the burning tests according to UL 94 (the third edition dated Sep. 3, 1985) was V-0>V-1>V-2. No dropping occurred in V-0 and dropping occurred in V-2.

Gloss

The gloss was determined by the ASTM test method D 523.

EXAMPLE 1

28 parts by weight of brominated bisphenol A epoxy resin ( Pratherm EC-20; a product of Dainippon Ink & Chemicals, Inc.) and 7 parts by weight of antimony trioxide having an average particle diameter of 4 μm were compounded into a mixture of 50 parts by weight of an ABS resin (40% of polybutadiene, 15% of acrylonitrile and 45% of styrene) and 50 parts by weight of an AS resin (30% of acrylonitrile and 70% of styrene) and melt-mixed with a 40 mm-diameter extruder (with a vent) kept at 220° C. to form pellets. The pellets were injection-molded at 220° C. to form a molding, which was subjected to the performance tests. The results are given in Table 1.

EXAMPLES 2 to 4

The same procedure as that of Example 1 was repeated except that antimony trioxide having an average particle diameter of 4 μm was replaced by antimony trioxide having an average particle diameter of 5.2 μm, 7.8 μm or 9 μm. The results of the performance tests are given in Table 1.

EXAMPLE 5

The same procedure as that of Example 1 was repeated except that the brominated bisphenol A epoxy resin was replaced by 28 parts by weight of tetrabromobisphenol A carbonate oligomer (Fire Guard FG-7500; a product of Teijin Chemicals Ltd.) and antimony trioxide having an average particle diameter of 5.2 μm and that the extrusion temperature and injection-molding temperature were set at 200° C. The results of the performance tests are given in Table 2.

EXAMPLES 6 AND 7

The same procedure as that of Example 1 was repeated except that the brominated bisphenol A epoxy resin was replaced by 20 parts by weight of tetrabromobisphenol A, 20 parts by weight of bis(tribromophenoxy)ethane and 4 parts by weight of antimony trioxide having an average particle diameter of 5.2 μm. The results of the performance tests are given in Table 2.

COMPARATIVE EXAMPLE 1

28 parts by weight of brominated bisphenol A epoxy resin ( Pratherm EC-20) was compounded into 100 parts by weight of the same resin mixture as that of Example 1, and melt-mixed with a 40 mm-diameter extruder (with a vent) kept at 220° C. to form pellets. The pellets were injection-molded at 220° C. to form a molding, which was subjected to the performance tests. The results are given in Table 3 which indicates that the flame resistance is inferior when the amount of the flame retardant is same, though the light resistance is superior to that obtained when antimony trioxide was used together.

COMPARATIVE EXAMPLE 2

The same procedure as that of Comparative Example 1 was repeated except that the amount of the brominated bisphenol A epoxy resin was altered to 37 parts by weight. The results of the performance tests are given in Table 3 which indicates that although the light resistance was superior to that obtained when antimony trioxide was used together, the amount of the flame retardant had to be increased to attain a flame resistance of V-0, which caused a serious reduction in the Izod impact strength.

COMPARATIVE EXAMPLE 3 to 5

The same procedure as that of Example 1 was repeated except that 7 parts by weight of antimony trioxide having an average particle diameter of 0.5 μm, 1 μm or 2 μm was used. The results of the performance tests are given in Table 3 which indicates that the light resistance was poor.

EXAMPLES 8 and 9

The same procedure as that of Example 1 was repeated except that antimony trioxide having an average particle diameter of 9.5 μm or 11 μm was used. The results of the performance tests are given in Table 3 which indicates that the light resistance was improved, though the flame resistance, gloss and Izod impact strength were reduced.

COMPARATIVE EXAMPLE 6

The same procedure as that of Example 1 was repeated except that the brominated bisphenol A epoxy resin was replaced by a tetrabromobisphenol A carbonate oligomer (Fire Guard FG-7500; a product of Teijin Chemicals Ltd.) and antimony trioxide having an average particle diameter of 0.5 μm. The results of the performance tests are given in Table 4 which indicates that the light resistance was poor.

EXAMPLE 10

The same procedure as that of Example 1 was repeated except that the brominated bisphenol A epoxy resin was replaced by a tetrabromobisphenol A carbonate oligomer (Fire Guard FG-7500; a product of Teijin Chemicals Ltd.) and antimony trioxide having an average particle diameter of 11 μm. The results of the performance tests are given in Table 4, which indicates that the light resistance was improved, though the flame resistance, gloss and Izod impact strength were reduced.

COMPARATIVE EXAMPLE 7

The same procedure as that of Example 1 was repeated except that the brominated bisphenol A epoxy resin was by 20 parts by weight of tetrabromobisphenol A and 4 parts by weight of antimony trioxide having an average particle diameter of 0.5 μm and that the extrusion temperature and injection molding temperature were set at 200° C. The results of the performance tests are given in Table 4, which indicates that the light resistance was poor.

EXAMPLE 11

The same procedure as that of Comparative Example 7 was repeated except that antimony trioxide used had an average particle diameter of 11 μm. The results of the performance tests are given in Table 4 which indicates that the light resistance was improved, though the gloss and Izod impact strength were reduced.

EXAMPLE 12

The same procedure as that of Example 1 was repeated except that antimony trioxide having an average particle diameter of 4 μm was replaced by antimony trioxide having an average paticle diameter of 4.5 μm. The results of the performance tests are given in Table 4.

TABLE 1

| | Average particle diameter (μm) | Ex. 1 | Ex. 2 | Ex. 3 | Ex. 4 |
|---|---|---|---|---|---|
| Styrene resin | | 100 | 100 | 100 | 100 |
| Brominated epoxy resin | | 28 | 28 | 28 | 28 |
| Antimony trioxide | 4 | 7 | | | |
| Antimony trioxide | 5.2 | | 7 | | |
| Antimony trioxide | 7.8 | | | 7 | |
| Antimony trioxide | 9 | | | | 7 |
| Combustibility (1/16") | — | V-0 | V-0 | V-0 | V-0 |
| Gloss (%) | — | 89 | 87 | 87 | 85 |
| Color difference (ΔE) (300 h) | — | 22 | 20 | 15 | 14 |
| Izod impact strength (kg-cm/cm) | — | 17 | 15 | 11 | 10 |

TABLE 2

| | Average particle diameter (μm) | Ex. 5 | Ex. 6 | Ex. 7 |
|---|---|---|---|---|
| Styrene resin | | 100 | 100 | 100 |
| Brominated epoxy resin | | | | |
| TBA carbonate oligomer | | 28 | | |
| Tetrabromobisphenol A | | | 20 | |
| Bis(tribromophenoxy)ethane | | | | 20 |
| Antimony trioxide | 5.2 | 7 | 4 | 4 |
| Combustibility (1/16") | — | V-0 | V-2 | V-2 |
| Gloss (%) | — | 87 | 89 | 88 |
| Color difference (ΔE) (300 h) | — | 18 | 13 | 11 |
| Izod impact strength (kg-cm/cm) | — | 13 | 18 | 19 |

TABLE 3

| | Average particle diameter (μm) | Comp. Ex. 1 | Comp. Ex. 2 | Comp. Ex. 3 | Comp. Ex. 4 | Comp. Ex. 5 | Ex. 8 | Ex. 9 |
|---|---|---|---|---|---|---|---|---|
| Styrene resin | | 100 | 100 | 100 | 100 | 100 | 100 | 100 |
| Brominated epoxy resin | | 28 | 37 | 28 | 28 | 28 | 28 | 28 |
| Antimony trioxide | 0.5 | | | 7 | | | | |
| Antimony trioxide | 1 | | | | 7 | | | |
| Antimony trioxide | 2 | | | | | 7 | | |
| Antimony trioxide | 9.5 | | | | | | 7 | |
| Antimony trioxide | 11 | | | | | | | 7 |
| Combustibility (1/16") | — | V-2 | V-0 | V-0 | V-0 | V-0 | V-1 | V-2 |
| Gloss (%) | — | 89 | 89 | 89 | 90 | 89 | 83 | 83 |
| Color difference (ΔE) (300 h) | — | 18 | 19 | 27 | 27 | 25 | 12 | 9 |
| Izod impact strength (kg-cm/cm) | — | 23 | 12 | 18 | 18 | 19 | 6 | 6 |

TABLE 4

| | Average particle diameter (μm) | Comp. Ex. 6 | Ex. 10 | Comp. Ex. 7 | Ex. 11 | Ex. 12 |
|---|---|---|---|---|---|---|
| Styrene resin | | 100 | 100 | 100 | 100 | 100 |
| TBA carbonate oligomer | | 28 | 28 | | | |
| Tetrabromobisphenol A | | | | 20 | 20 | |
| Brominated epoxy resin | | | | | | 28 |
| Antimony trioxide | 0.5 | 7 | | 4 | | |
| Antimony trioxide | 4.5 | | | | | 7 |
| Antimony trioxide | 11 | | 7 | | 4 | |
| Combustibility (1/16") | | — | V-0 | V-0 | V-2 | V-2 | V-0 |
| Gloss (%) | | — | 90 | 82 | 90 | 84 | 88 |
| Color difference (ΔE) (300 h) | | — | 25 | 8 | 20 | 8 | 20 |
| Izod impact strength (kg-cm/cm) | | — | 19 | 5 | 26 | 7 | 15 |

We claim:

1. A flame-retardant styrene resin composition comprising 100 parts by weight of a styrene resin consisting of a mixture of an ABS resin and an AS resin, 3–50 parts by weight of a halogen-containing flame retardant selected from the group consisting of a brominated bisphenol A epoxy resin, a tetrabromobisphenol A carbonate digomer, tetrabromobisphenol A, bis(tribromophenoxy)-ethane, and mixtures thereof and 0.50 to 15 parts by weight of antimony trioxide having an average particle size of from 5.2–9 microns.

2. The composition as claimed in claim 1, in which the flame retardant is used in an amount from 6 to 35 parts by weight.

3. The composition of claim 1, wherein said halogen-containing flame retardant is a brominated bisphenol A epoxy resin.

4. The composition of claim 1, wherein said halogen-containing flame retardant is a brominated bisphenol A epoxy resin and said antimony trioxide has an average particle size of 5.2 microns.

5. The composition of claim 1, wherein said antimony trioxide has an average particle diameter of 7.8 microns.

6. The composition of claim 1, wherein said antimony trioxide has an average particle diameter of 9 microns.

7. The composition of claim 1, wherein said halogen-containing flame retardant is tetrabromobisphenol A and said antimony trioxide has an average particle diameter of 5.2 microns.

8. The composition of claim 1, wherein said halogen-containing flame retardant is bis(tribromophenoxy)ethane and said antimony trioxide has an average particle diameter of 5.2 microns.

9. The composition of claim 1, wherein said halogen-containing flame retardant is tetrabromobisphenol A carbonate oligomer and said antimony trioxide has an average particle diameter of 5.2 microns.

* * * * *